United States Patent [19]

Fink, Jr.

[11] 4,397,447

[45] Aug. 9, 1983

[54] POPPET VALVE MEANS

[75] Inventor: Arthur C. Fink, Jr., Lonedell, Mo.

[73] Assignee: Husky Corporation, Pacific, Mo.

[21] Appl. No.: 250,167

[22] Filed: Apr. 2, 1981

[51] Int. Cl.$^3$ .............................................. F16K 31/60
[52] U.S. Cl. ..................................... 251/356; 251/357; 141/206; 222/509
[58] Field of Search ................ 141/206; 222/509, 518, 222/559; 251/357, 339

[56] References Cited

U.S. PATENT DOCUMENTS

| 2,874,996 | 2/1959 | Zajac | 251/339 |
| 3,817,285 | 6/1974 | Wilder et al. | 141/206 |
| 3,877,480 | 4/1975 | Hughes et al. | 137/329.06 |
| 4,016,910 | 4/1977 | Dumpis et al. | 141/226 |
| 4,031,930 | 6/1977 | Sutcliffe et al. | 141/208 |

Primary Examiner—A. Michael Chambers
Attorney, Agent, or Firm—Paul M. Denk

[57] ABSTRACT

An improved poppet valve constructed having a lower member partially mating and fitting within an upper portion is constructed in the shape of a top hat, and with the lower member having a formed shoulder upon which a gasket seats, and being biased thereagainst by means of the flanged upper portion of the valve, with a spring forcing these various components, including the gasket, against the valve seat of the body of the dispenser. An aperture is formed through the base member of the valve, and opens into that location between this base member and the upper portion of the poppet valve, thereby effectively venting any encapsulated air located between these two components, or to prevent the development of any vacuum therein.

6 Claims, 3 Drawing Figures

POPPET VALVE MEANS

BACKGROUND OF THE INVENTION

This invention relates generally to valve means, and more specifically pertains to a poppet valve for use in a fuel dispenser and which eliminates previous problems in valve operation that would cause disruption in its efficient performance.

Various style of poppet valves are current used in existing fuel dispensers marketed to the trade. One problem that does prevail in most such dispensers, and more specifically with respect to this valve means, is that such valve means are constructed of various component parts that mate together, and in their functioning, may develop vacuuming between its various component parts, or compress air into a cushioning effect, that disrupts the efficient operation of the valve, causing either jumping in the valve's operation, or a erratic disruption in the natural flow of fuel, or its shut-off, particularly when metering the flow as during dispenser operation.

Various types of valves are readily shown in the prior art, and for example, U.S. patent to Boudot, et al, No. 3,653,415, discloses an automatic shut-off dispensing nozzle, having one style of main valve means located therein. This generally shows the usual construction of a simplified form of valve means as used for seating upon the nozzle valve seat during dispenser usage and closure. Another example of a different form of valve is shown in the U.S. patent to Carder, et al, No. 3,273,609.

The patent to Lasater, No. 4,199,012, discloses a liquid dispensing nozzle having vapor recovery arrangement, and it can be seen that its main poppet valve is of the type that is generally used in the trade, constructed of a cuplike member that mates upon a valve base, having a gasket arranged intermediate the two, with the combined means generally functioning to force the valve gasket into a seating arrangement upon the shown valve seat. One problem, though, that does occur with this style of valve, as previously briefly alluded to, is that as the stem pushes the valve upwardly off of its valve seat, frequently air develops between the two valve components, causing an air cushioning effect, which prevents the gradual lifting of the valve off of the said valve seat, and more particularly, prevents its gradual reseating back onto the valve seat as the dispenser is being shut-off. Hence, when that occurs, the type of problem previously described do occur, they are a nuisance in the usage of such a dispenser nozzle, can cause inaccuracies in its recording of information, and are the type of problems that are intended to be remedied by the invention described herein.

Other U.S. patents showing related type of nozzle shut-off means are shown in the U.S. patent to Wood, et al, No. 4,139,031, and the nozzle patent to Taylor, et al, U.S. Pat. No. 4,139,032. Additionally, the patent to McMath, et al, upon a liquid dispensing nozzle, shown in the U.S. Pat. No. 4,196,759, discloses a similar type of valve. Other forms of valves are shown in the U.S. patent to Saito, et al, No. 4,203,478; U.S. patent to Billian, No. 3,196,908, the U.S. patent to Briede, No. 3,085,600, in addition to two U.S. patents to Sutcliffe and Dumpis, Nos. 4,016,910, and 4,031,930, both of which patents are owned by a common assignee of this current invention and application. Similar type nozzle valve assemblies are shown in the U.S. patent to Hughes, et al, No. 3,877,480.

It is, therefore, the principal object of this invention to provide a differently structured poppet valve means wherein venting is provided intermediate that space between the valve components so as to assure prompt and cooperative action between said components during the dispenser's actuation between fuel flow and shut-off.

Another object of this invention is to provide a poppet valve means wherein a vent aperture is provided interiorly of the poppet valve components so as to eliminate air or fluid cushioning that develops therein, in addition to any vacuum that may be caused between these two components during their repeated usage.

Another object of this invention is to provide means for preventing vibrations or jerking movements that may be caused to a fuel dispenser during its repeated usage.

Yet another object of this invention is to provide a simplified means for improving the operations of the poppet valve of a fuel dispenser and which can be easily constructed into its components during dispenser assembly.

Still another advantage of this invention is to provide structural changes in the valves configuration to enhance its accuracy during dispenser nozzle usage.

These and other objects will become more apparent to those skilled in the art upon reviewing the summary of this invention, and upon undertaking a study of the description of the preferred embodiment, in view of the drawings.

SUMMARY OF THE INVENTION

This invention contemplates the formation of a poppet valve means, of the type generally used in the trade, and which incorporates further means to eliminate erratic actions of the dispenser during its routine usage. The poppet valves for a dispenser normally incorporate a base member that is designed for shouldering a gasket, and which gasket is normally biased against the valve seat provided within the main flow channel of the dispenser nozzle. An upper portion to the valve means functions in the nature of a cap, configured in the shape of a top hat, and which mates upon the upper segment of the aforesaid base member, which cap incorporates an integral flange that biases upon the valve disposed gasket, and through the efforts of a spring means compressing against this upper valve portion, it continuously urges the gasket into a seating relationship upon the valve seat of the dispenser.

As previously explained, air or fluid may be compressed between these two main components of the poppet valve, cause a cushioning effect, which can disrupt the proper seating of the valve upon the valve seat of the dispenser, thereby causing the flow to be erratic during dispensing, or its gradual shut-off after completion of a dispensing function, due to this air cushioning effect detrimentally generated within the poppet valve. In addition, the creation of a vacuum between the various valve components also is believed to and can cause some disruption in the natural flow of fuel, or its gradual shut-off after completing a dispensing function.

To alleviate the foregoing problems, the current invention envisions the arrangement of a supplemental aperture from the stem formed cavity located into the bottom of the base member of the poppet valve, and which aperture extends through the upper segment of the said base member, and opening into that location between this base member of the poppet valve and its upper portion. In this manner the arranged aperture effectively vents any cushioned air encapsulated between these two portions of the poppet valve, or in the alternative, prevents the development of any vacuum therein.

BRIEF DESCRIPTION OF THE DRAWINGS

In the drawings, FIG. 1 provides a side view of a fuel dispenser, shown in hidden line, while the improved poppet valve means of this invention is disclosed in its unseated actual location within said dispenser.

DESCRIPTION OF THE PREFERRED EMBODIMENT

Figure 1:
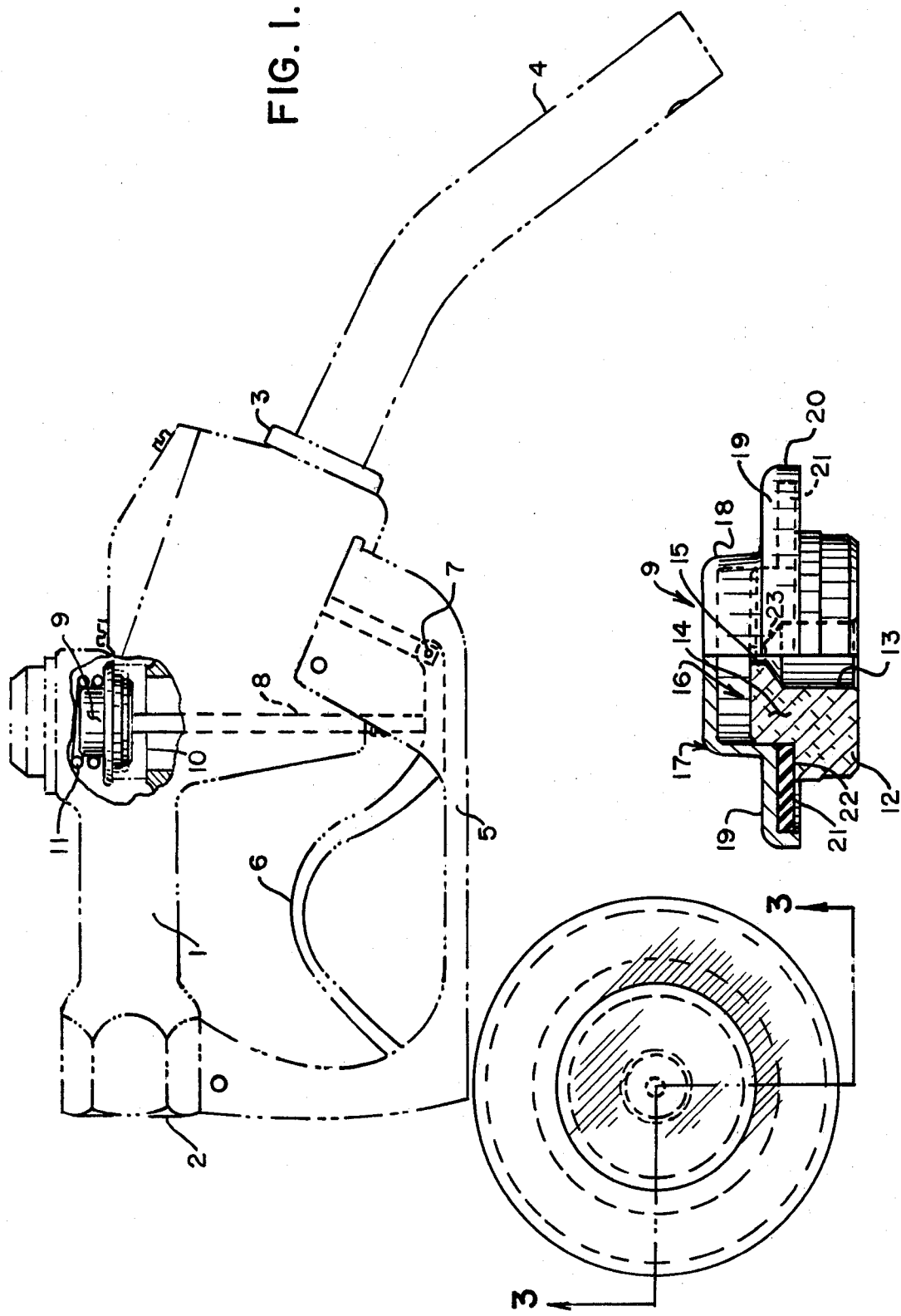

In referring to the drawings, and in particular FIG. 1, there is disclosed the nozzle body 1 of the fuel dispenser which has at its back end an inlet 2 into which the fuel enters the nozzle, and an outlet 3 having connected to it a spout 4 and through which the fuel is delivered to the fuel tank of a vehicle, or the like. A handle guard 5 has located within its opening a handle 6 that may be grasped by the user and pivoted upwardly, as about its pivot point 7 and during its upward shifting, as during opening of the nozzle, a stem 8 is lifted upwardly, and effectively unseats a poppet valve means 9 which is of a particular design, and which will be subsequently analyzed in detail.

This valve 9 seats upon a valve seat 10 for normally maintaining the nozzle in closure, and thereby prevent the dispensing of any fuel, but that when it is lifted upwardly, against the bias of the compression spring 11, and line pressure, the poppet valve becomes displaced from its corresponding valve seat, thereby allowing the passage of fuel through the nozzle and out of its spout to the fuel tank.

Figure 3:
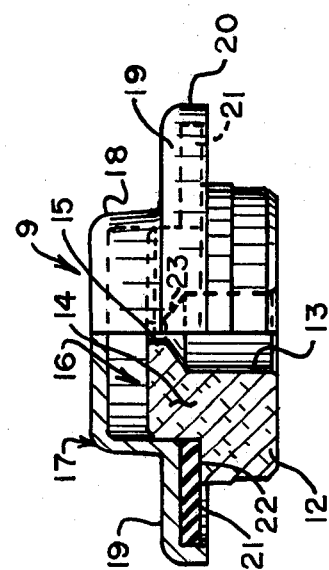
FIG. 3 provides a partial side sectional view of the poppet valve means of this invention.
Figure 2:
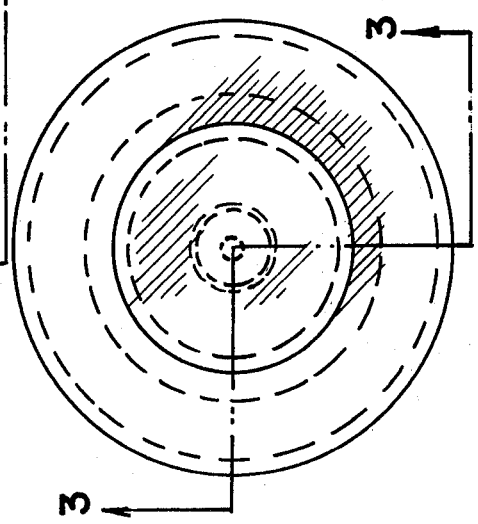
FIG. 2 provides a top view of the improved poppet valve means of this invention.

The particular poppet valve means of this invention is more accurately disclosed in FIGS. 2 and 3. As can be seen, a base member 12 is designed having a cavity, as at 13, provided into the surface of its lower segment, and which extends upwardly towards the upper segment, or at 14, of the valve. In addition, an aperture, as at 15, communicates with the formed cavity 13, and extends upwardly through the upper segment of the base member 12, and opens into the cavity, as at 16, provided intermediate the upper segment of this base member, and the upper portion 17 of this poppet valve. This upper portion 17 is in the configuration of a top-hat having a cup shaped portion 18 which is generally designed for internally mating upon the upper segment 14 of the base member 12, with said portion 18 having integrally formed at its lower edge a flange 19 that flares outwardly around the circumference of the portion 17 and which is turned downwardly, as at 20, to form a marginal or peripheral lip for this upper portion at this location.

Arranged intermediate the base member 12 and the upper portion 17 of this poppet valve is a gasket 21, which seats upon a formed shoulder 22 of the said base member, and which rests against the circular flange 19 of the upper portion 17, embraced within its integral lip 20. As the bias of the spring 11 is urged upon the upper portion 17, it effectively compresses the said portion downwardly against the base member 12, urging the gasket 21 for retention upon the shoulder 22 for its effective capture intermediate these two components of the poppet valve.

As previously explained, there is a space 16 formed between the upper portion 17 of the valve, and its base member 12, and frequently when the stem 8 lifts the poppet valve from the nozzle valve seat 10, air collected within this spacing 16 has a tendency to form a cushion, preventing the effective and gradual lifting of the valve from its said seat, or in the alternative, when it is lowered downwardly, and into closure, a vacuum formed in this space 16 may have some adverse effects upon the effective operations of the poppet valve. Hence, the aperture 15 communicating with the cavity 13 of the base member 12 effectively vents the spacing intermediate these two valve components, thereby totally eliminating the previously described and analyzed problems. It may also be noted that the stem 8 of the nozzle is seated within the formed cavity 13, rest at its upper edge upon the beveled surface 23, so as to prevent the formation of any further seal at this location, which could possibly effect a re-occurrence of the developed air cushion within the spacing 16. To assure complete elimination of this problem, the surface 23 may have one or more shallow grooves provided therein, or the upper edge of the stem 8 may have a slight groove upon it, so as to assure that no air seal will occur at this location, or effect the development of any compressed air or vacuum within the space 16 formed intermediate the upper portion 17 and base member 12 of the poppet valve 9.

Variations or modifications within the structure of the formed poppet valve means may occur to those skilled in the art upon reviewing the subject matter of this disclosure. Such variations, or modifications, if within the spirit of this invention, are intended to be encompassed within the claims to any patent protection issuing upon the same. The description of the preferred embodiment as set forth herein is done so for illustrative purposes only.

Having thus described the invention what is claimed and desired to be secured by Letters Patent is:

1. An improved poppet valve means for use in a fuel dispenser and of the type having a body portion incorporating an inlet for the fuel being pumped and a spout outlet for dispensing of the fuel, and a handle means actuating a stem for effecting an opening or closing of the poppet valve means from a valve seat during fuel dispensing, comprising, said poppet valve means having a base member, said base member formed having an upper segment and a lower segment, said base member having means for cooperating with the stem to render the base member responsive to movement of the stem, said poppet valve means having an upper portion incorporating a valve seal and with said upper portion mating with the base member and forming a chamber intermediate therewith, said upper portion of the poppet valve means disposed for substantially simultaneous movement with the shifting of its base member, means provided upon said base member to prevent disruption in the cooperation between the movements of the upper portion and the base member during actuation of the poppet valve means during fuel dispensing, said means formed of the base member for cooperating with the stem movements comprising a cavity formed into the bottom of the said base member, said base member having an aperture therethrough to prevent the development of any vacuum and air cushioning between the said base member and its mating within the valve upper portion during shifting of the said poppet valve means between open and closed positions, and said vacuum preventing and fluid or air venting aperture formed in the base member extending from its said formed cavity and through the upper segment of the said base member and communicating with the formed chamber provided intermediate the upper portion of the valve means and the upper segment of the said base member that matingly fits therein.

2. The invention of claim 1 and wherein said handle stem inserts into and seats within the base member cavity.

3. The invention of claim 1 and wherein the upper segment of the base member being of a lesser diameter than the lower segment of the said base member, said lower segment of the base member where it joins the integral upper segment forming an upwardly disposed shoulder thereat, and a gasket seated upon said member shoulder and urged thereagainst by the upper portion of the valve means resting thereon, with said gasket being disposed for normally seating upon the dispenser body portion valve seat for curtailing fuel flow during dispenser shut-off.

4. The invention of claim 3 and wherein said gasket extends outwardly of the base member shoulder for seating upon the said body portion valve seat.

5. The invention of claim 4 and wherein said upper portion of the valve means includes a first cuplike member disposed for overlying and mating upon the upper segment of the base member, an integral flange extending outwardly from the lower edge of the said cuplike portion, an integral lip extending downwardly from the outer perimeter of the said formed flange, with said combined flange and lip overlying the outer edges of the base member gasket means to assure its retention upon the base member shoulder, while simultaneously urging it against the body portion valve seat during dispenser closure.

6. The invention of claim 5 and including spring means provided within the body portion of the dispenser, and biasing against the upper surface of the cuplike member of the upper portion of the valve means for continuously urging the said poppet valve means into closure against the said body portion valve seat.

* * * * *